United States Patent
Junge et al.

(10) Patent No.: US 6,644,142 B2
(45) Date of Patent: Nov. 11, 2003

(54) SHIFT SELECTOR LEVER DEVICE

(75) Inventors: Dieter Junge, Grünendeich (DE); Peter Von Ey, Hamburg (DE)

(73) Assignee: DaimlerChrysler AG, Stuttgart (DE)

( * ) Notice: Subject to any disclaimer, the term of this patent is extended or adjusted under 35 U.S.C. 154(b) by 9 days.

(21) Appl. No.: 09/841,317

(22) Filed: Apr. 24, 2001

(65) Prior Publication Data

US 2001/0042418 A1 Nov. 22, 2001

(30) Foreign Application Priority Data

May 9, 2000 (DE) .......................... 100 22 433

(51) Int. Cl.[7] .............................................. F16H 59/02
(52) U.S. Cl. ................ 74/473.25; 74/473.33; 74/473.18
(58) Field of Search .................. 74/473.18, 473.25, 74/473.33, 473.27, 473.28, 335

(56) References Cited

U.S. PATENT DOCUMENTS

| | | | | |
|---|---|---|---|---|
| 4,550,627 A | * | 11/1985 | Lauer et al. ............. 74/473.25 |
| 4,996,468 A | * | 2/1991 | Field et al. ................. 15/319 |
| 5,195,387 A | * | 3/1993 | Skeppstrom ............. 74/473.21 |
| 5,277,078 A | * | 1/1994 | Osborn et al. ............ 267/158 |
| 5,357,820 A | * | 10/1994 | Moroto et al. ............... 74/335 |
| 5,406,860 A | * | 4/1995 | Easton et al. ................ 74/335 |
| 5,509,322 A | * | 4/1996 | Anderson et al. ............ 74/335 |
| 5,566,582 A | * | 10/1996 | Beadle et al. ............... 180/333 |
| 5,622,079 A | * | 4/1997 | Woeste et al. ............... 74/335 |
| 5,689,996 A | * | 11/1997 | Ersoy ........................... 74/335 |
| 5,791,197 A | * | 8/1998 | Rempinski et al. ...... 74/473.18 |
| 5,799,539 A | * | 9/1998 | Haase ..................... 74/473.18 |
| 5,845,535 A | * | 12/1998 | Wakabayashi et al. ... 200/61.88 |
| 5,862,708 A | * | 1/1999 | Shamoto .................. 74/473.18 |
| 5,913,935 A | * | 6/1999 | Anderson et al. ............. 74/335 |
| 5,946,976 A | * | 9/1999 | Miyoshi et al. .......... 74/473.18 |
| 6,029,537 A | * | 2/2000 | Nagao .................... 273/148 B |
| 6,148,686 A | * | 11/2000 | Kataumi .................. 74/473.12 |

FOREIGN PATENT DOCUMENTS

| | | |
|---|---|---|
| DE | 41 27 537 C2 | 3/1992 |
| DE | 44 26 207 C1 | 8/1995 |
| DE | 196 10 766 C2 | 9/1997 |
| EP | WO 97/04251 | 2/1997 |

\* cited by examiner

*Primary Examiner*—David A. Bucci
*Assistant Examiner*—Julie K. Smith
(74) *Attorney, Agent, or Firm*—Klaus J. Bach

(57) ABSTRACT

In a selector lever device, for an automatic transmission of a motor vehicle, with a selector lever, which is fixed in a selector lever support seat and is guided in a gate structure including at least one gate branch wherein it is held in a home position by a detent unit, the selection lever is supported so that it can be swivelled from the home position about at least one swivel axis for actuating the detent structure providing for a one-touch function. The detent unit has a selector lever seat separate from the first selector lever engagement lever seat, by way of which the detent unit is operatively connected to the selector lever.

8 Claims, 3 Drawing Sheets

SHIFT SELECTOR LEVER DEVICE

The invention relates to a selector lever device especially for the automatic transmission of a motor vehicle.

BACKGROUND OF THE INVENTION

DE 196 10 766 C2, which is assigned to the assignee of the present invention, discloses a shift selector device for a transmission. The selector and shift device has a selector lever, which is held in a selector lever seat or held by a fork head and is mounted so that it can swivel about a first axis for the actuation of a gear shift lever shaft and about a second axis extending perpendicular to the first axis for performing an actuation movement. The selector lever is further guided in a T-shaped selector gate with two gate branches. At one end of an intermediate branch there is a selector position D, from which the selector lever, guided in the second gate branch perpendicularly to the intermediate selector gate branch, can be swiveled about the second axis into selector position D(+) for shifting up one gear irrespective of the shift program or into a selector position D(−) for shifting down one gear irrespective of the shift program.

In order to achieve an automatic return of the selector lever from its D(+) or D(−) selector positions and to define a home position, the shift and selector device includes a detent unit. At a transition between the selector lever seat and a shift finger formed onto the selector lever seat the detent unit has a retainer, into which a locating ball, supported by roller bearings on a moveable detent element, engages when the selector lever reaches its selector position D. Associated inclined faces, which by the design of their gradient provide for a variable shift force on the selector lever over a shift travel, adjoin the retainer in the direction of each selector position D(+) and D(−) respectively. The moveably supported detent element has a pressure spindle supporting the locating ball, which spindle is displaceable in a cylindrical receiver of the selector lever seat and is supported in relation to the selector lever seat by means of a compression spring.

In either selector position D(+) or D(−) respectively one of two micro-switches is actuated by a shift finger formed onto the selector lever seat. The microswitches are fixed to the base of the shift control housing by means of a holder.

The object of the invention is to provide a selector lever device of the type described above with a particular view to enhanced gear selection and shifting convenience and to facilitate assembly of the arrangement.

SUMMARY OF THE INVENTION

In a selector lever device, for an automatic transmission of a motor vehicle, with a selector lever, which is fixed in a selector lever support seat and is guided in a gate structure including at least one gate branch wherein it is held in a home position by a detent unit, the selector lever is supported so that it can be swivelled from the home position about at least one swivel axis for actuating the detent structure providing for an actuation function.

The detent unit has a selector lever seat separate from the first selector lever engagement lever seat, by way of which the detent unit is operatively connected to the selector lever.

Preferably, the detent unit has a selector lever engagement seat separate from the selector lever support seat, by way of which the detent unit is operatively connected to the selector lever. The selector lever engagement seat provides for a positive interlocking connection between the selector lever and the detent device. The separate selector lever engagement seat creates additional degrees of freedom for individual adjustment of the selector lever device, thereby increasing the convenience and facilitating assembly. Furthermore the detent unit can be selectively arranged and adapted to an advantageous alignment of the swivel axis. In this way it is possible, for example, to arrange the swivel axis and the gate branch for the actuation function perpendicular, parallel or in various positions at an angle to a second suitable gate branch.

If the selector lever device has a return unit, which returns the selector lever in the direction of the home position defined by the detent unit by means of a return spring separate from a detent spring of the detent unit, a significant adjustment and return force with a small hysteresis can be achieved. An operator receives clear feedback as to whether a desired swivel movement has been performed and whether the selector lever has already returned to its home position.

The selector lever engagement seat simplifies the detent unit design and/or permits adjustment of the return unit. The detent unit also defines the home position by the and it permits adjustment of the equilibrium position of the return spring of the return unit in relation to one another. This is achieved specifically by a component which forms a detent contour and which is displaceable for adjustment of the home position. A so-called double detent can be avoided and the same force characteristics can be achieved in more than one swiveling direction. The detent unit and the return unit may advantageously be adjusted to one another during or after assembly. In addition, assembly is facilitated.

The return spring of the return unit may act on the selector lever support seat or it may advantageously be incorporated into the detent unit, thereby avoiding the need for tolerances and advantageously matching the return unit and the detent unit to one another, especially if the return spring of the return unit acts directly on the selector lever seat of the detent unit.

In a further embodiment, a sensor unit is incorporated into the detent unit. A deflection from the home position can easily be determined with precision with few intermediate components and without tolerances or play caused thereby. An expensive adjustment process during assembly can be avoided, thereby saving costs. An especially direct detection can be achieved by forming the sensor unit integrally with the second selector lever seat of the detent unit. If a return spring of the return unit and/or a sensor unit is incorporated into the detent unit, a module can moreover be created, which can be advantageously pre-assembled and tested before installation.

Various solutions are feasible, such as sensor units with a Hall sensor, with electrical contacts etc. It is particularly advantageous, however if the sensor unit has at least one photoelectric light barrier, which can detect a certain swivel position of the selector lever. A contact-free, low-wear, temperature-insensitive and accurate sensor unit can be achieved, which is especially suitable for use in a motor vehicle.

In a further embodiment of the invention, the selector lever engagement seat of the detent unit is in the axial direction of the selector lever at a greater distance from the swivel axis than the selector lever support seat, and the selector lever engagement seat is preferably arranged above the selector lever support seat. The frequently unused space above the selector lever support seat is then utilized, and especially advantageous lever ratios can moreover be achieved. The lever ratios mean that the desired high adjustment and return forces of the detent unit and of any selector lever return spring incorporated in the detent unit can be achieved with a lightweight, inexpensive spring element. Furthermore, at a greater distance from the swivel axis any adjustment travel distance of the selector lever is increased. As a result, the larger adjustment travel distance can be detected, in a simple manner, by a sensor unit incorporated in the detent unit.

The selector lever seat of the detent unit can be designed so that it is linearly displaceable or advantageously supported so that it can swivel on one axis. A cost effective, low-friction bearing of simple design can be employed. In addition, the adjustment travels of the selector lever can be translated into relatively large deflection movements, which are easily detectable by a sensor unit and the overall dimensions can be adapted to the prevailing circumstances. It now is possible, for example, to arrange a detent contour of the detent unit in various radial directions emanating from the selector lever.

The selector structure according to the invention can be used in various devices. It can be used to particular advantage, however, in selector arrangements for automatic transmissions, with especially high convenience and ease of assembly requirements.

The invention and advantages thereof will become more readily apparent from the following description on the basis of the accompanying drawing. Various embodiments of the invention are represented in the drawing.

DESCRIPTION OF PREFERRED EMBODIMENTS

Figure 1:
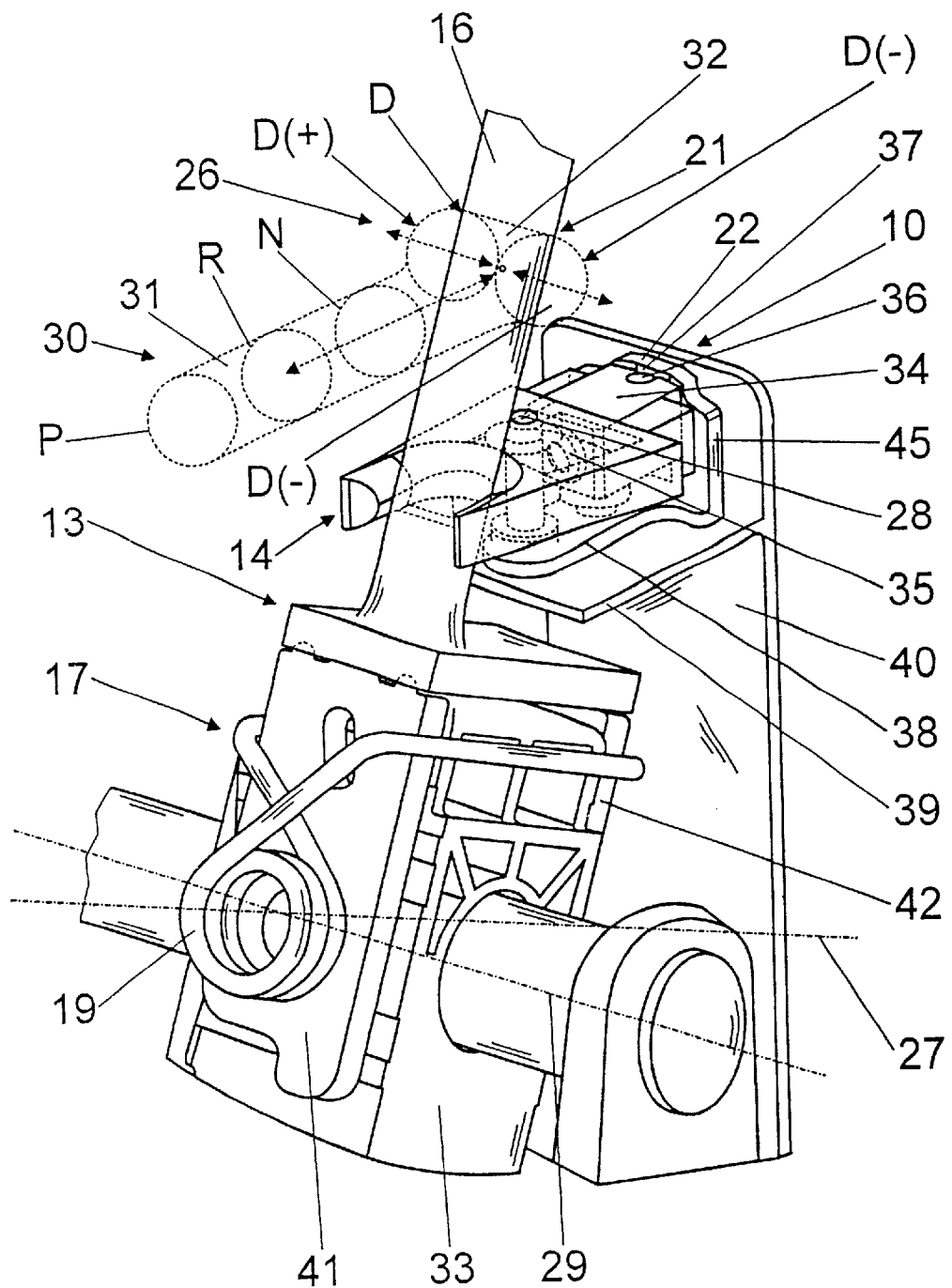
FIG. 1 shows a selector and shift device according to the invention

FIG. 1 shows a selector and shift device for an automatic transmission of a motor vehicle. The selector and shift device has a selector lever 16, which is fixed to a selector lever seat support 13 and/or to a fork head and is supported by the latter by way of a receiver 33 so that it can swivel about an axis 29. The selector lever 16 is guided in a T-shaped gate 30 with two gate aisles 31, 32. In the main gate aisle 31 the selector lever 16 can be swivelled about the axis 29 from a selector position P, that is, a parking position, by way of a selector position R for the engagement of a reverse gear and by way of selector position N for a neutral state of the automatic transmission to a selector position D for actuating a shift program for automatic shifting of all forward gears.

In the selector position D, the selector lever 16 can be pivoted with swivel movements 26 for a so-called one-touch shifting from a home position 21 about a swivel axis 27 into a selector position D(+) in the gate aisle 32 for shifting up one gear irrespective of the shift program or into a selector position D(−) in gate aisle 32 for shifting down one gear irrespective of the shift program. Instead of shifting up and shifting down a one-touch movement might also be used to trigger signals for other functions that will appear suitable to the person skilled in the art, such as signals for a gear selection limit etc.

In the home position 21, a detent unit 10 holds the selector lever 16. According to the invention, the detent unit 10 has a selector lever engagement seat 14 with a U-shaped seat area separate from the selector lever support seat 13. If the selector lever 16 in the center gate aisle 31 is swiveled into the selector position D, the selector lever 16 with its shaft is simultaneously guided into the U-shaped seat area and, in the direction of the swivel movement 26 for the D(+) and D(−) selector positions, is engaged by the selector lever seat 14 of the detent unit 10.

The detent unit 10 is arranged above the first selector lever seat 13 in the axial direction of the selector lever 16. In the axial direction of the selector lever 16, the selector lever seat 14 of the detent unit is at a greater distance from the swivel axis 27 than the selector lever support seat 13. The selector lever seat 14 is supported so that it can swivel about a vertical shaft 28. In the selector lever seat 14 a piston 34 is displaceably guided against a compression spring 35. A roller 36 is rotatably mounted in the piston 34 on the side remote from the seat area. The roller is pressed by the helical compression spring 35 against a detent contour 37, which is integrally formed by an L-shaped component 22 with the shaft 28. The component 22 is fixed with its first leg 38 on a first carrier plate 39 extending horizontally and with its second leg 45 to a second carrier plate 40 which extends vertically and is integrally formed with the first carrier plate 39 and fixed to the housing.

The selector and shift device furthermore has a return unit 17 with a leg spring 19, the legs of which extend at an axial distance from the swivel axis 27 and parallel thereto. They encompass the receiver 33 supported so as to be pivotable about the swivel axis 27 and plates 41, 42 of the selector lever seat 13 capable of swiveling around the swivel axis 27. Following a deflection of the selector lever 16 from the home position 21, the return unit 17 in support of the detent unit 10 with its leg spring 19 returns the selector lever 16 towards the home position 21 defined by the detent unit 10. A force gradient over an adjustment travel of the selector lever 16 can be set by way of the detent contour 37 and by the pre-tension force of the leg spring 19.

The component 22 forming the detent contour 37 is displaceable on the carrier plates 39, 40 in the direction of the swivel movement 26, so that, during assembly, the home position 21 defined by the detent unit 10 can be adjusted independently of an equilibrium position of the leg spring 19. When the equilibrium position of the leg spring 19 and the home position 21 defined by the detent unit 10 coincide, the component 22 is fixed to the carrier plates 39, 40. To align the equilibrium position of the leg spring 19 on the home position 21 defined by the detent unit 10, the selector lever 16 with the selector lever seat 13 may furthermore be displaced in an axial direction on the axis 29 and then fixed in relation to the axis 29.

Figure 2:
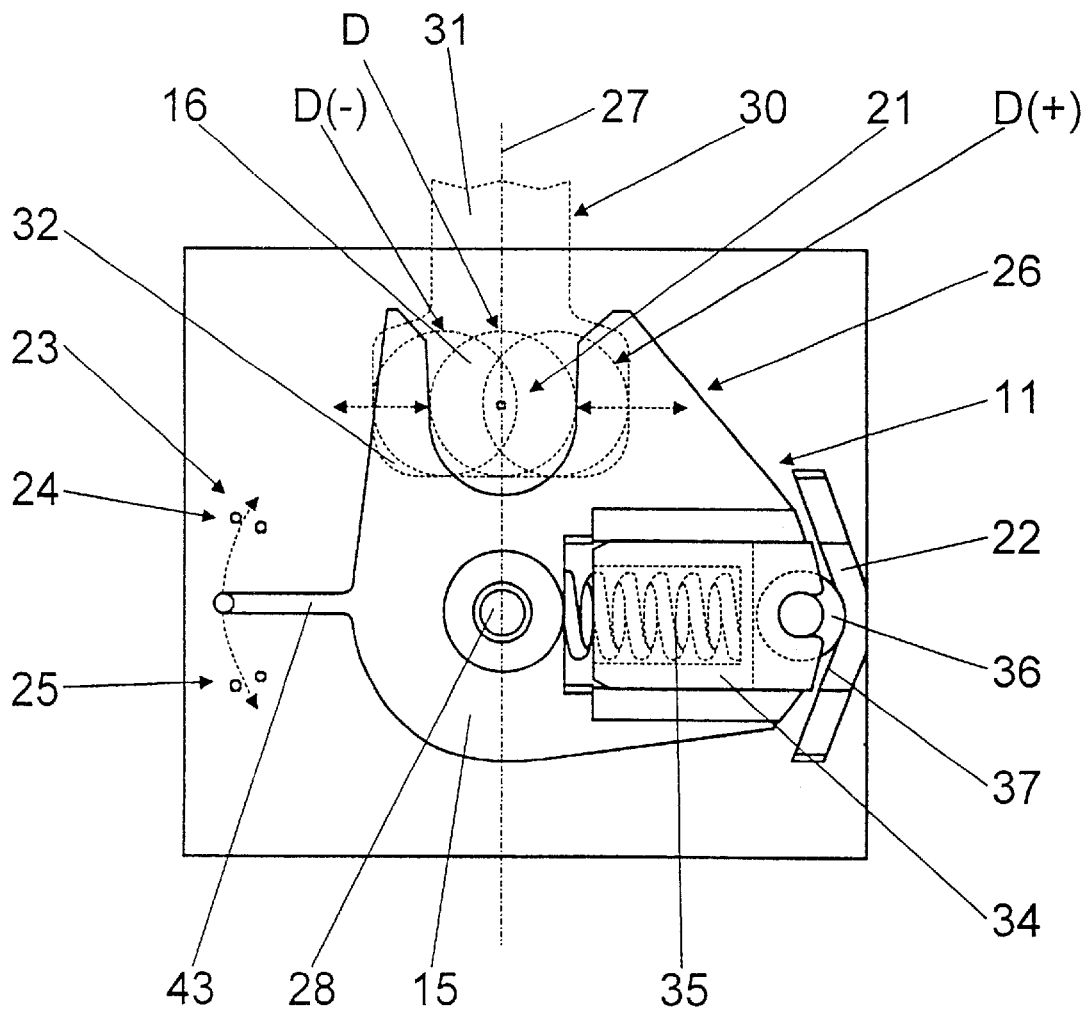
FIG. 2 shows a detent unit.
Figure 3:
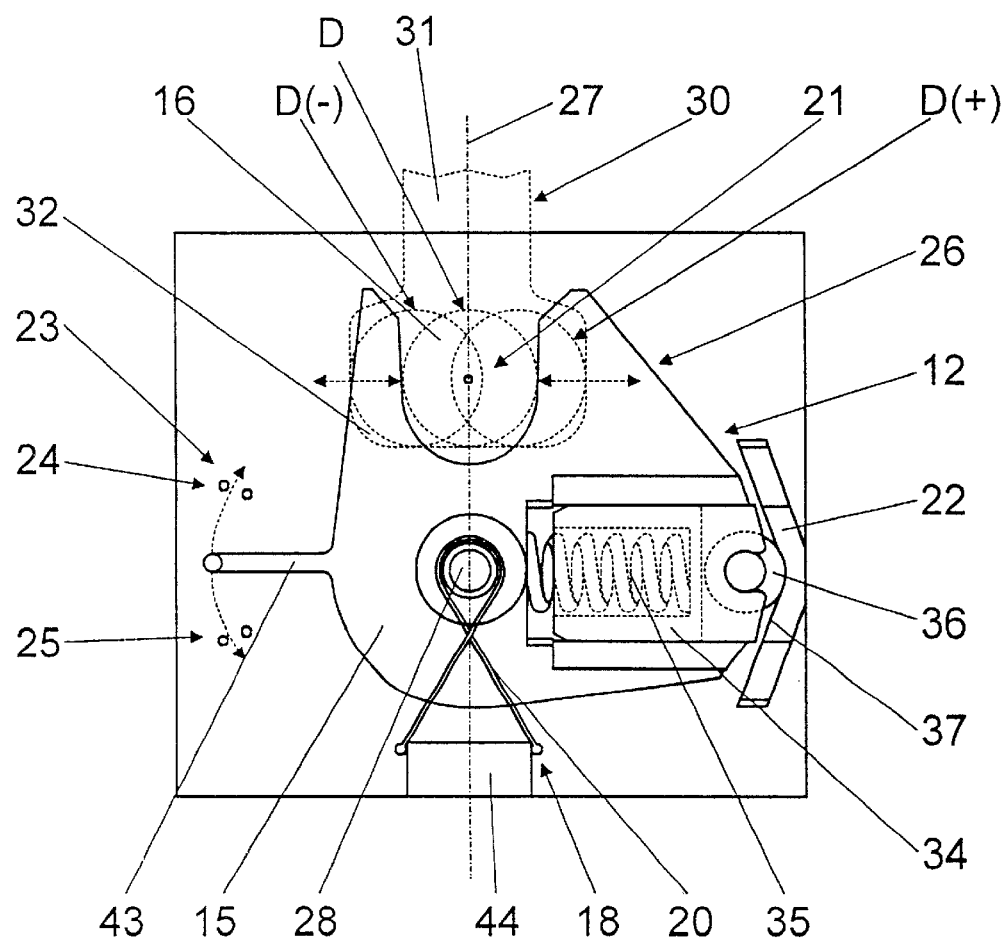
FIG. 3 shows a section of an alternative embodiment of a detent unit with an integral return spring.

Sections of alternative detent units 11 and 12 are represented in FIGS. 2 and 3. Essentially identical components are numbered with the same reference numbers. For features and functions that remain constant, reference may also be made to the description of the example of the embodiment shown in FIG. 1.

In contrast to the detent unit 10 of FIG. 1, the detent unit 11 of FIG. 2 has a selector lever seat 15, in which a piston 34 with a roller 36 is guided at right angles to the swivel axis 27 against a coil spring 35. In a home position 21 of the selector lever 16, the piston 34 is engaged in a detent contour 37. A sensor unit 23 is also incorporated in the detent unit 11. A pointer 43 of the sensor unit 23 is formed onto the selector lever seat 15. If the selector lever 16 is swiveled into the selector position D(+), the pointer 43 interrupts a first photoelectric light barrier 24 just ahead of a first swivel limit position of the selector lever 16, thereby triggering a signal for up-shifting by one gear. If the selector lever 16 is swiveled into a selector position D(−,) the pointer 43 interrupts a second photoelectric light barrier 25 just ahead of a second swivel limit position of the selector lever 16, thereby triggering a signal for downshifting to a lower gear.

In the example of an embodiment in FIG. 3 a leg spring 20 of a return unit 18, which is supported by its legs on a stop 44 and is fixed by its helical part to the selector lever seat 15, is incorporated in the detent unit 12. In order to be able to align an equilibrium position of the leg spring 20 on a home position 21 defined by the detent unit 12, the stop 44 is designed so that it is displaceable parallel to the swivel movement 26 of the selector lever 16 about the swivel axis 27. When the equilibrium position of the leg spring 20 and the home position 21 of the detent unit 12 coincide, the stop 44 is fixed in position.

What is claimed is:

1. A shift selector lever device for a transmission of a motor vehicle, comprising a shift gate with a main gate aisle and a branch gate aisle extending at an end of said main gate aisle transversely in opposite directions from said main gate aisle and a selector lever supported on a selector lever support seat, so as to be movable along said main gate aisle and also in a direction transverse to said main gate aisle, when disposed in said branch gate aisle, and a detent unit pivotally supported at said end of said main gate aisle and having a selector lever engagement seat spaced from said selector lever support seat for engaging said selector lever when said selector lever is moved to said end of said main gate aisle so that said detent unit is operatively connected to said selector lever for actuating said detent unit when said selector lever is pivoted from a home position in said main gate aisle sidewardly in opposite directions for providing a touch actuation function, a return spring structure for returning said selector lever to said home position after being moved sidewardly for said touch actuation function and a separate detent spring unit with a detent piston for independently returning said detent unit to an equilibrium position following a deflection of the selector lever from said home position and a component forming a detent contour arranged so as to be engaged by said detent unit and being displaceable for adjustment according the home position of said shift lever.

2. The selector lever device according to claim 1, wherein said detent spring unit and said return spring unit are of adjustable design such that the home position defined by the detent unit and said equilibrium position of the return spring unit of the detent unit can be adjusted in relation to one another.

3. The selector lever device according to claim 1, wherein said detent piston of said detent spring unit includes a roller in engagement with said detent contour.

4. The selector lever device according to claim 3, wherein said return spring of said return spring unit acts on said selector lever seat of said detent unit.

5. The selector lever device according to claim 1, wherein a shift lever position sensor unit including at least one photoelectric light barrier by means of which a swivel position of the selector lever can be detected is incorporated in said detent unit.

6. The selector lever device according to claim 5, wherein said sensor unit is at least in part integrally formed with the selector lever engagement seat of said detent unit.

7. The selector lever device according to claim 1, wherein in the axial direction of the selector lever the selector lever engagement seat of the detent unit is at a greater distance from the swivel axis of said selector lever than the selector lever support seat.

8. The selector lever device according to claim 1, wherein said selector lever engagement seat is part of said detent unit which is pivotably supported on a shaft.

\* \* \* \* \*